US00RE47397E

(19) United States
(12) Reissued Patent
Waldman et al.

(10) Patent Number: US RE47,397 E
(45) Date of Reissued Patent: May 21, 2019

(54) FABRIC WITH EQUAL MODULUS IN MULTIPLE DIRECTIONS

(71) Applicant: GLOBAL TRADEMARKS, LLC, Stockertown, PA (US)

(72) Inventors: Mark Waldman, New Hope, PA (US); Mark Lazarus, Holland, PA (US)

(73) Assignee: Global Trademarks, LLC, Stockertown, PA (US)

(21) Appl. No.: 15/160,681

(22) Filed: May 20, 2016

Related U.S. Patent Documents

Reissue of:
(64) Patent No.: 8,726,700
Issued: May 20, 2014
Appl. No.: 13/197,617
Filed: Aug. 3, 2011

U.S. Applications:
(60) Provisional application No. 61/370,295, filed on Aug. 3, 2010.

(51) Int. Cl.
*D04B 1/22* (2006.01)
*D04B 21/20* (2006.01)
*D04B 21/18* (2006.01)

(52) U.S. Cl.
CPC ..... *D04B 21/207* (2013.01); *D04B 21/18* (2013.01); *Y10T 442/413* (2015.04)

(58) Field of Classification Search
CPC ..... D04B 21/07; D04B 21/18; Y10T 442/413
See application file for complete search history.

(56) References Cited

U.S. PATENT DOCUMENTS 1,855,033 A 4/1932 Spiers
3,069,885 A 12/1962 Cooper et al.
3,456,193 A 7/1969 Muñoz
3,459,193 A 8/1969 Krieger
3,733,859 A * 5/1973 Wittmann ..... D04B 21/12 66/193

(Continued)

FOREIGN PATENT DOCUMENTS

CN 1326519 A 12/2001
CN 101437996 A 5/2009

(Continued)

OTHER PUBLICATIONS

Taiwanese Examination Report dated Aug. 3, 2010 from corresponding Taiwan Patent Application No. 100127525, 9 pages.

(Continued)

*Primary Examiner* — Patricia L Engle
(74) *Attorney, Agent, or Firm* — Ohlandt, Greeley, Ruggiero & Perle, L.L.P.

(57) ABSTRACT

A garment including a fabric covering a portion of a body of a wearer. The fabric comprises an isotropic material having a first direction with a first modulus of elasticity, and a second direction that is perpendicular to the first direction. The second direction has a second modulus of elasticity and a third direction that is at an angle of 45 degrees to the first direction and the second direction. The third direction has a third modulus of elasticity. The first modulus of elasticity, the second modulus of elasticity and the third modulus of elasticity are within the same ranges of magnitudes of modulus of elasticity to form an isotropic fabric for such garment.

23 Claims, 6 Drawing Sheets

(56) References Cited

U.S. PATENT DOCUMENTS

| | | | | |
|---|---|---|---|---|
| 3,772,127 | A | 11/1973 | James | |
| 4,044,575 | A | 8/1977 | Krug | |
| 4,103,485 | A | 8/1978 | Brües | |
| 4,270,368 | A | 6/1981 | Ragoza et al. | |
| 4,786,549 | A | 11/1988 | Richards | |
| 4,817,400 | A | 4/1989 | Baesgen et al. | |
| 4,909,049 | A | 3/1990 | Baesgen et al. | |
| 5,250,351 | A | 10/1993 | Kondou et al. | |
| 5,359,732 | A | 11/1994 | Waldman et al. | |
| 5,542,269 | A | 8/1996 | Richards | |
| 5,596,888 | A | 1/1997 | McLarty, III et al. | |
| 5,657,648 | A | 8/1997 | Ives et al. | |
| 5,727,943 | A | 4/1998 | Bernhardt | |
| 5,765,401 | A | 6/1998 | Ives et al. | |
| 5,783,278 | A | 7/1998 | Nishimura et al. | 428/102 |
| 5,987,933 | A | 11/1999 | Metzler | |
| 6,223,782 | B1 | 5/2001 | Watkins | |
| 6,408,656 | B1 | 6/2002 | Ory et al. | |
| 6,698,252 | B1 | 3/2004 | Norris et al. | |
| 6,705,129 | B2 | 3/2004 | Pot d'Or | 68/8 |
| 6,722,164 | B1 | 4/2004 | Ives et al. | |
| 6,745,601 | B2 | 6/2004 | Pierelli | |
| 6,971,252 | B2 | 12/2005 | Therin et al. | |
| 7,174,749 | B2 | 2/2007 | Ternon et al. | 66/192 |
| 7,503,941 | B2 | 3/2009 | Hamano et al. | |
| 7,743,476 | B2 | 6/2010 | Rock et al. | 28/159 |
| 8,065,894 | B2 | 11/2011 | Yanagi et al. | |
| 2002/0184925 | A1 | 12/2002 | McClellan et al. | |
| 2003/0150243 | A1 | 8/2003 | Pot d'Or et al. | |
| 2004/0000173 | A1 | 1/2004 | Keller | |
| 2005/0112975 | A1 | 5/2005 | McMurray | |
| 2006/0107701 | A1 | 5/2006 | Ternon et al. | |
| 2007/0082579 | A1* | 4/2007 | Baran | A41C 3/00 450/77 |
| 2008/0189824 | A1 | 8/2008 | Rock et al. | |
| 2008/0208360 | A1 | 8/2008 | Meneghin et al. | |
| 2009/0049579 | A1 | 2/2009 | Roberts | |

FOREIGN PATENT DOCUMENTS

| | | | |
|---|---|---|---|
| EP | 1 085 115 | A2 | 3/2001 |
| GB | 1012427 | | 12/1965 |
| JP | 2003/166152 | A | 6/2003 |
| WO | 2009/133821 | A1 | 11/2009 |
| WO | 2010/061188 | A1 | 6/2010 |

OTHER PUBLICATIONS

European Examination Report dated Oct. 4, 2016 from corresponding European Application No. 11 815 282.6, 8 pages.

Chinese First Office Action dated Feb. 4, 2017 from corresponding Chinese Patent Application No. 201610166402.8, 21 pages.

International Preliminary Report on Patentabiity dated Jul. 1, 2012 corresponding to International Patent Application No. PCT/US2011/046468, 32 pages.

International Search Report for Corresponding to International Patent Application No. PCT/US2011/046468 dated Jan. 11, 2012, 3 pages.

Chinese Second Notification of Office Action dated Oct. 17, 2014 from corresponding Chinese Patent Application No. 201180038184.5, 4 pages.

Chinese Office Action dated Dec. 17, 2013 corresponding to Chinese Patent Application No. 201180038184.5, 25 pages.

European Extended Search Report dated Jul. 29, 2015 from corresponding European Patent Application No. 11815282.6, 9 pages.

Taiwan Search Report dated Jul. 2, 2014 from corresponding Taiwan Patent Application No. 100127525, 1 pages.

Written Opinion for Corresponding to International Patent Application No. PCT/US2011/046468 dated Jan. 11, 2012, 11 pages.

Summons to attend Oral Proceeding from corresponding European Patent Application No. 11815282.6, dated Nov. 21, 2017, 10 pages.

* cited by examiner

FABRIC WITH EQUAL MODULUS IN MULTIPLE DIRECTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the benefit of U.S. Provisional Application No. 61/370,295 filed on Aug. 3, 2010, which is incorporated by reference herein.

BACKGROUND OF THE DISCLOSURE

1. Field of the Disclosure

The present disclosure relates generally to a fabric having substantially isotropic stretchability and uniform modulus in multiple directions. More particularly, the present disclosure relates to an elasticized fabric having isotropic stretchability and uniform modulus in all directions that is incorporated into a garment or a garment that is constructed entirely of such isotropic fabric.

2. Description of Related Art

There are several different types of stretch fabrics being used today for swimwear, shapewear, garment liner, or undergarment. These fabrics generally fall into the following classifications: a nylon/spandex combination in a tricot-type knit or circular knit, a nylon/spandex combination in a raschel-type knit, a cotton/spandex combination in a circular knit, and a polyester/spandex combination. Each of these combinations and knits has specific applications and specific characteristics.

The nylon/spandex combination in a tricot construction generally includes 80% nylon and 20% spandex, usually LYCRA (a registered trademark of Invista, a subsidiary of Koch Industries, Inc.). This fabric is commonly used for its four-way stretchability, i.e. the ability to stretch in both the length and width directions of the fabric. The advantage of this type stretch is that it permits the garment to fit different shapes and sizes without substantial modification to the pattern of the garment.

The nylon/spandex combination in a Raschel-type construction is characterized by a combination of 85% nylon and 15% spandex. The stretch is typically significantly greater in one direction than the stretch in the other. Raschel-type knitting commonly used in swimwear, provides a fabric with a much greater stretch in the warp direction as compared to the tricot type construction.

The cotton/spandex combination generally includes 90% cotton and 10% spandex. Also included within this classification is a poly/cotton/spandex mix made of 45% polyester, 45% cotton and 10% spandex. These fabrics are often used for exercise wear, such as leotards and the like. The cotton is used for perspiration absorption. Also, the cotton within the blend provides a softer feel to the fabric.

The polyester/spandex combination is a lightweight and less expensive alternative to the nylon/spandex or cotton/spandex combinations. This fabric material is primarily used in the United States in active sportswear and intimate apparel.

There are many variations and blends of spandex for use in swimwear, shaping garments, liners or the like. Spandex is generally defined as a synthetic elastomeric fiber having a very high elasticity to break point (up to approximately 500% to 600%) and a high recovery from stretching. Though the chemistry is very complex, basically spandex is a series of elastomeric products including hard and soft segments and cross linking between the same. The fibers produced are generally white, clear or bright depending on the level of titanium dioxide added, are not dyeable and are stronger and lighter than rubber. The properties of spandex include high stretch, low set (the ability to spring back to its original shape concluded after repeated stretching), high durability, easiness of cleaning, uniformity and versatility.

However, none of these fabrics offers substantially isotropic stretchabilty and equal modulus in all directions.

Accordingly, there is a need for a fabric that can be used in swimwear, undergarment, garment liner and shapewear that is substantially isotropic and offers equal modulus in all directions to provide a balanced degree of compression, shaping and comfort to the wearer.

SUMMARY OF THE DISCLOSURE

The present disclosure provides for a fabric that offers substantially isotropic stretchability and equal modulus in all directions to offer a balanced degree of comfort and control to the wearer of a garment made with such a fabric.

The fabric includes at least one layer of material that lay in a single plane. The material comprises a first direction having a first modulus of elasticity, a second direction that is perpendicular to the first direction. The second direction has a second modulus of elasticity and a third direction that is at an angle of 45 degrees to the first direction and the second direction. The third direction has a third modulus of elasticity. The first modulus of elasticity, the second modulus of elasticity and the third modulus of elasticity are within the same ranges of magnitude of modulus.

The garment includes a fabric covering a portion of a body of a wearer. The wherein the fabric comprises an isotropic material having a first direction having a first modulus of elasticity, a second direction that is perpendicular to the first direction. The second direction has a second modulus of elasticity. A third direction that is at an angle of 45 degrees to the first direction and the second direction has a third modulus of elasticity. The first modulus of elasticity, the second modulus of elasticity and the third modulus of elasticity are within the same ranges of magnitudes of modulus of elasticity.

DETAILED DESCRIPTION OF THE DISCLOSURE

Figure 1:
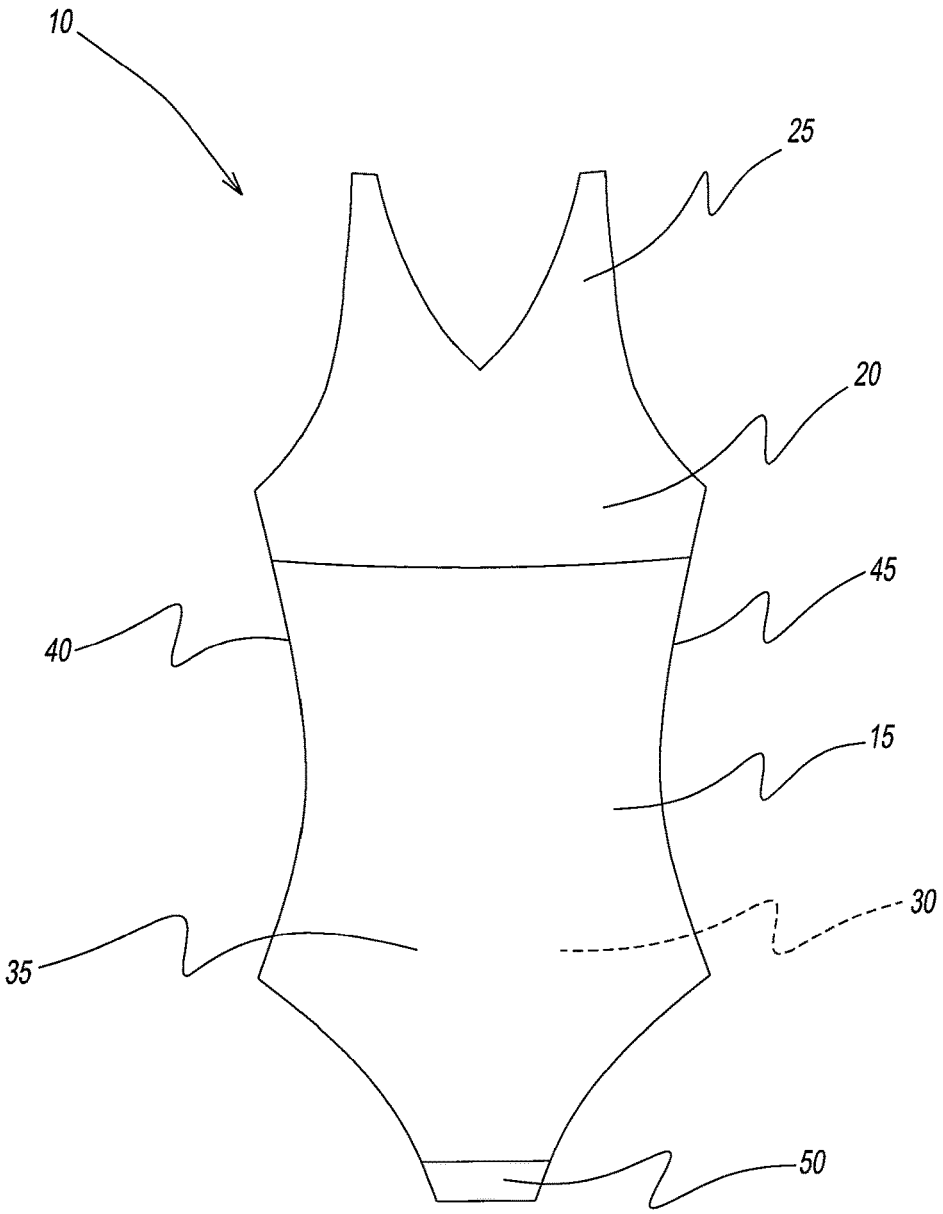
FIG. 1 illustrates a swimsuit incorporating a fabric according to the present disclosure.

Referring to the drawings and, in particular to FIG. 1, there is illustrated a swimsuit that is generally referred to by reference numeral 10. The swimsuit 10 includes a torso portion 15 and a bra portion 20. Torso portion 15 may include any number of panels, such as, a front panel 35 and rear or back panel 30 or a single panel. Front panel 35 and rear panel 30 are joined by seams 40 and 45 and at crotch 50. Front panel 35 may be formed by a single panel or any number of panel or sections, as desired. Similarly, rear panel 30 may also be divided into separate panels or portions. Bra portion 20 has one or more shoulder straps 25, depending upon the style of the swimming suit. The fabric of the present disclosure provides support and added comfort to the various areas of the swimsuit. While a swimming suit is shown in FIG. 1, other types of garments such as shapewear, undergarment, liner and bra frame construction could also incorporate the fabric of the present disclosure. Such other types of garments could include the fabric of the present disclosure as either a liner, as the garment itself or as a portion of the garment.

The present disclosure generally contemplates a fabric incorporated into a swimsuit or other type of garment, in which the fabric has specified properties. The fabric may be incorporated in only a part of the torso portion 15, bra portion 20, such as a front panel 35 or at shoulder straps, respectively, or may comprise the entire swimsuit 10.

Swimsuit 10 is made from a fabric that has a generally isotropic stretchability. Isotropic stretchability means that the fabric from which swimsuit 10 is made is capable of expanding or elongating in equal amounts in the length and width directions of the fabric as well as along the diagonal direction at an angle of 45° relative to the width and length directions of the fabric. This isotropic stretchability is characterized by a high degree of elasticity and modulus which is provided for purposes of comfort of the wearer. By having an equal or substantially equal modulus in all directions, the wearer will not experience uncomfortable restrictions to stretching during movement. Were there a higher modulus across the body of the wearer relative to the length, for example, the wearer could be uncomfortably restricted at the waist and the appearance of the garment on the wearer may be compromised.

Figure 2:
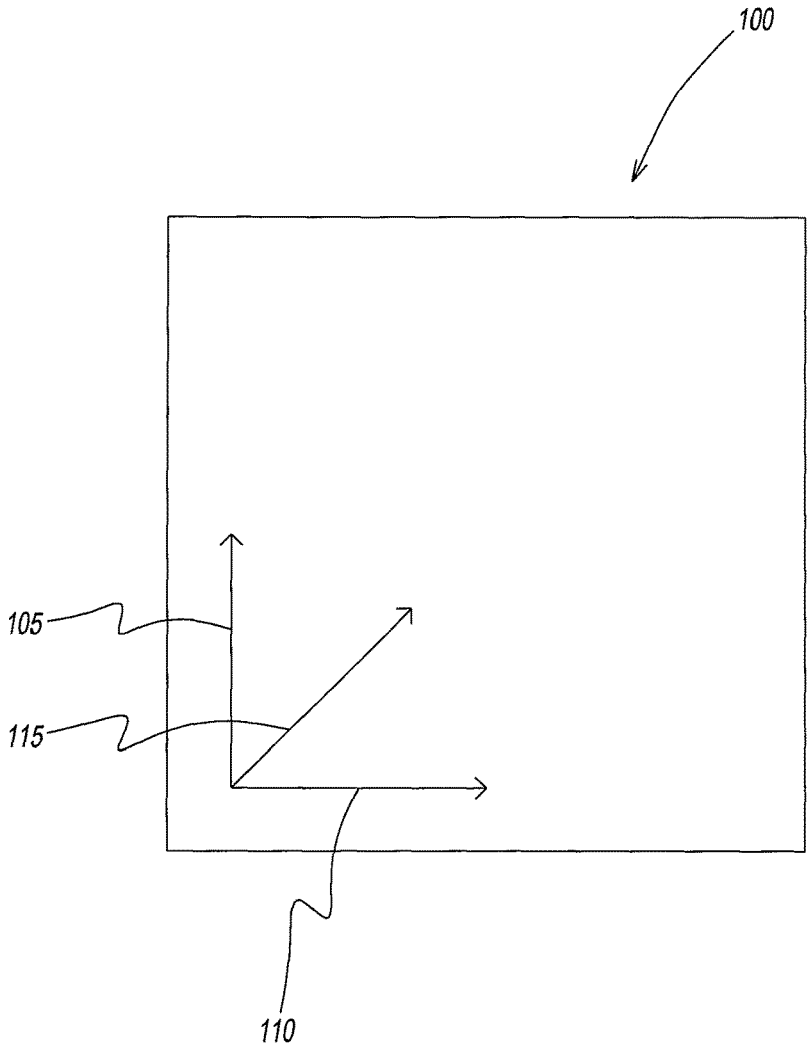
FIG. 2 illustrates an exemplary fabric according to a first embodiment of the present disclosure.

One embodiment of the preferred fabric according to the present disclosure is generally illustrated in FIG. 2. The fabric generally referenced by reference numeral 100 is produced by a warp knitting method. Fabric 100 has a width direction 105, a length direction 110 that is perpendicular to width direction 105, and a diagonal direction 115 that is at an angle of 45° relative to width direction 105 and length direction 110. When fabric 100 is tested in three different directions, width direction 105, length direction 110 and at an angle of 45° relative to width direction 105 and length direction 110, fabric 100 exhibits isotropic stretchability and equal modulus in each direction. Significantly, isotropic stretchability and equal modulus exists independent of how fabric 100 is cut and sewn into the garment or garment portion.

Figure 3:
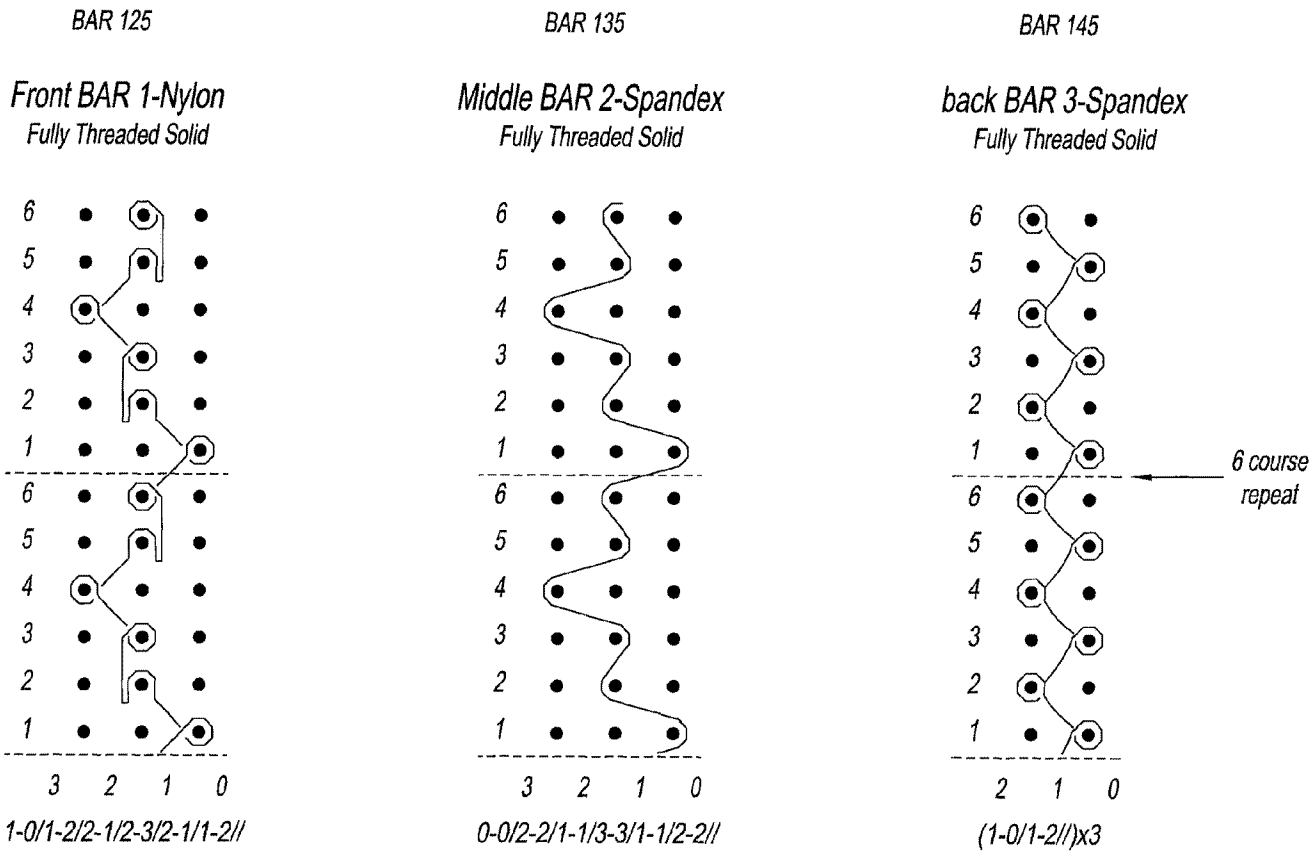
FIG. 3 illustrates a stitch pattern of the fabric according to the first embodiment.

FIG. 3 illustrates a stitch pattern for the isotropic fabric of FIG. 2. Referring to FIG. 2, fabric 100 is knitted using three different yarns. Fabric 100 is knitted using three integrally knitted bars, bar 125, bar 145 and bar 135 knitted between bar 125 and bar 145. Bar 125, or front bar is made from nylon thread, such as a flat filament nylon. The repeating stitch pattern is knitted on a warp knitting machine is 1-0/1-2/2-1/2-3/2-1/1-2. This pattern then repeats. Bar 135, or middle bar is made from spandex. Bar 135 is a loose knit as seen in FIG. 3, in comparison to bar 125. Bar 135 has a repeating pattern that is knitted on a warp knitting machine. Stitch pattern of bar 135 is 0-0/2-2/1-1/3-3/1-1/2-2/. By not wrapping around pins of knitting machine, yarns of bar 135 are knitted between yarns of bar 125 and yarns of bar 145. Bar 145, or back bar, is knitted using spandex. The pattern of bar 145 is 1-0/1-2 repeated three times. While fabric 100 is shown as being knitted with three different bars 125, 135 and 145, two different yarns could also be used in three different knitted bars to also achieve the isotropic property of fabric 100.

After three bars, bar 125, 135 and 145 are knitted, fabric 100 is heated and intersecting yarns of bars 135 and 145 adhere to adjacent threads to create an integrated and isotropic fabric. Other factors, such as denier, type of yarn, heat application profile, and dying and finish affect the isotropic properties of the fabric.

Further, in fabric 100 there is a relationship between the stretch and modulus characteristics that produce a "wearing stretch" as experienced by the wearer. The modulus affects the "wearing stretch" function of a fabric in that the higher the modulus, the more resistant the fabric material will be to linear stretch. If the modulus is too high, the suit will not be comfortable or properly fit a range of body sizes. Accordingly, garments made from fabric 100 will fit a variety of different body types within a size because isotropic compression will fit like second skin, fitting and functioning on the body uniformly. When the modulus is not isotropic, the wearer will feel the fabric putting more pressure on the body in the direction with the higher modulus, thus creating discomfort.

Fabric 100 of the first embodiment includes a combination of yarns in combination with an elastomeric yarn, such as, spandex, and having a weight of approximately 7.95 or alternatively 7.5 to 8.4 ounces per square yard. To achieve isotropic properties, Fabric A preferably has a percentage of elastomeric yarn in a range of from 8% to 60% and a range of non-elastomeric yarn, such as nylon, of from 40% to 92%. A minimum of 16% elastomeric fabric yarn is preferred. These percentages of yarn represent percentages of weight of the fabric 100. Therefore, a low denier yarn will represent a lower percentage of such yarn in a fabric 100 in comparison to a high dernier yarn. Further, the yarns in combination with elastomeric yarn are preferably nylon, polyester, cotton, rayon, polypropylene, for example, or any similar yarn that is a hard yarn, a non-elastomeric yarn.

Table 1 below describes a fabric 100 that is isotropic and has equal modulus in the horizontal, vertical and 45° diagonal directions. The third column represents the ranges of acceptability for an isotropic fabric of the given content. The inclusion of elastomeric yarns ensures that there is a substantial amount of power in retraction of the garments indicated by a flatter stress-strain curve of the fabric through the fit zone. The flatter stress-strain curve of the fabric provides for a broader range of comfort at the fit point of 30% stretch and for comfort at 70% stretch of the fabric.

TABLE 1

| | Fabric 100 | Industry Standard Range |
|---|---|---|
| Actual Weight (oz/yard$^2$) | 7.95 | 7.5-8.4 |
| Content | 8% to 60% Elastomer and 40% to 92% Hard Yarns | 8% to 60% Elastomer and 40% to 92% Hard Yarns |
| Zwick Stretch | | |
| Length | 135% | 112%-137% |
| Width | 130% | 112%-137% |
| 45° | 114% | 112%-137% |

TABLE 1-continued

| | Fabric 100 | Industry Standard Range |
|---|---|---|
| Length Modulus | | |
| @30% | 3.36 (lbs of holding power) | 2.77-3.38 (lbs of holding power) |
| @50% | 6.33 | 5.85-7.15 |
| @70% | 9.61 | 9.31-11.37 |
| Width Modulus | | |
| @30% | 3.01 | 2.77-3.38 |
| @50% | 6.67 | 5.85-7.15 |
| @70% | 10.34 | 9.31-11.37 |
| 45° Modulus | | |
| @30% | 2.78 | 2.77-3.38 |
| @50% | 6.44 | 5.85-7.15 |
| @70% | 11.06 | 9.31-11.37 |

Specific readings for the modulus were taken at a thirty percent (30%) stretch or elongation point for the length, width and diagonal directions. For example, at 30% elongation, the modulus of fabric 100, in length direction 110, width direction 105 and 45° diagonal direction 115 is in a range of from 2.7 to 3.38 lbs of holding power. This range represents an industry standard. This stretch point is considered to be a normal fit position for a swimsuit. At the fit point, the fabric 100 or a swimsuit 10 made of the fabric 100 of the present disclosure is cut to have a substantially equal holding power in the length, width and 45° directions. Because of the flat stress-strain curve, at 50% stretch and 70% stretch, the swimsuit is still a comfortable fit during all ranges of movement. Significantly, different sizes of individuals can wear the same suit. For example, a woman who is five feet tall and a woman who is six feet tall can both be a size eight and still wear the same suit and be comfortable across a wide range of movements. Also, fabric 100 was made in the same color (black) as a control. Other conditions, such as temperature and humidity, were maintained constant during the test.

The fabric for the swimsuit of the present disclosure can be defined by applying a stretching test. Specifically, a stretching test using the fabrics and tensile cartridge of a Zwick Microprocessor DYP type machine can be used to determine the constant rate of extension (CRE) of the fabric at a specific load. The following chart shows the results of a CRE comparison loop method test performed on the Zwick machine using a 3 inch wide and a 10 inch loop and a 20 pound effective load. The data for the fabric of the present disclosure is compared to two standard swimsuit fabrics using the same testing procedure.

Fabric 100 exhibits test stretch values that are within the Industry Standard Range of the adjacent column. Fabric [200] *100* stretches in the range of 112% to 137% of its original width direction 105, length direction 110 and in a 45° diagonal direction 115 relative to width direction 105 and length direction 110. (As measured by the Zwick machine in accordance with the above noted procedure and using the first flex reading.) The percentage stretching for length of 135%, width of 130% and at a 45 degree angle of 114% are within the acceptable range to be considered isotropic. Further, at 30% elongation for width direction 105, length direction 110, and 45° diagonal direction 115, respectively, the amount of holding power or modulus in each direction is within the same acceptable range as identified by the Industry Standard Range. For each direction, the modulus or amount of holding power is within a range of 2.77 pounds to 3.38 pound of holding power.

Similarly, at 50% and 70% elongation for width direction 105, length direction 110 and 45° direction 115, the amount of holding power or modulus at each direction is within the same acceptable range of the Industry Standard as shown in Table 1. For each direction at 50% and at 70%, the modulus or amount of holding power is within a range of 5.85 pounds to 7.15 pounds and 9.31 to 11.37 pounds of holding power, respectively. Significantly, the holding power of fabric 100 at 45° diagonal direction at all levels of stretch or elongation is also within the same acceptable standardized range as exhibited in the length and width directions. (As measured by the Zwick machine in accordance with the above noted procedure and using the first flex reading.) Accordingly, fabric 100 is an isotropic fabric.

One of the benefits of the fabric 100 is the degree of compression and control that it offers. Due to fabric 100's excellent performance in retraction, fabric 100 is excellent for use in control or shaping garments or as the primary material for a control or shaping garment. While fabric 100 represents an isotropic fabric, other fabrics with similar compositions are within the scope of this disclosure.

Figure 4:
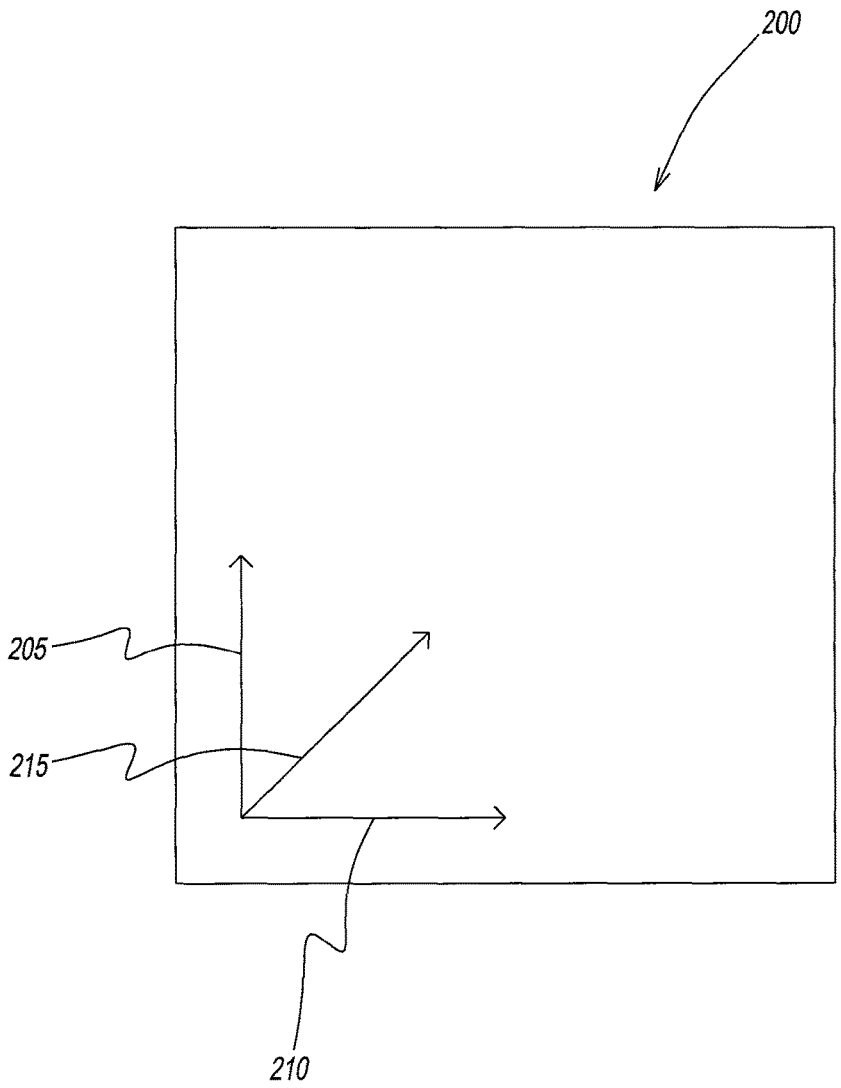
FIG. 4 shows an exemplary fabric according to a second embodiment of the present disclosure.

A second embodiment of a fabric of the present disclosure, fabric 200, exhibits isotropic stretchability and equal modulus in the length direction, width direction and 45° diagonal direction, and is shown at FIG. 4, and is generally referenced by reference numeral 200. Fabric 200 has a width direction 205, a length direction 210 and a 45° diagonal direction 215 that is at an angle of 45° relative to width direction 105 and length direction 210. Fabric 200 is a [warp] *circular* knit fabric knitted on a circular knitting machine. Fabric 200 is a jersey construction. Fabric 200 includes nylon, such as textured filament nylon, and a secondary elastomeric yarn. Elastomeric yarn of fabric B is a modified polyurethane. Elastomeric yarn of fabric B can also be spandex. Fabric 200 has a percentage of nylon ranging from 50 to 85% and an elastomer, elastomeric yarn, ranging from 15% to 50%. As an alternative to nylon, yarns such as polyester, cotton, rayon, polypropylene or any other hard yarn, a non-elastic yarn, could also be used along with the elastomeric yarn. Elastomeric yarn has a lower and flatter stress strain curve relative to fabric 100. The lower and flatter stress-strain curve indicates a lower level of power in retraction for fabric 200 at all levels of elongation in comparison to fabric 100.

TABLE 2

| | Fabric 200 | Industry Standard Range |
|---|---|---|
| Actual Weight (oz/yard$^2$) | 8.4 | 7.98-8.82 |
| Content | 50% to 85% Nylon & 15% to 50% Elastomer | 50% to 85% Nylon & 15% to 50% Elastomer |
| Zwick Stretch | | |
| Length | 221% | 193%-237% |
| Width | 233% | 193%-237% |
| 45° | 200% | 193%-237% |
| Length Modulus | | |
| @30% | 0.70 | 0.69-0.85 |
| @50% | 1.34 | 1.33-1.64 |
| @70% | 1.99 | 1.98-2.42 |

TABLE 2-continued

| | Fabric 200 | Industry Standard Range |
|---|---|---|
| Width Modulus | | |
| @30% | 0.73 | 0.69-0.85 |
| @50% | 1.93 | 1.33-1.64 |
| @70% | 2.02 | 1.98-2.42 |
| 45° Modulus | | |
| @30% | 0.84 | 0.69-0.85 |
| @50% | 1.64 | 1.33-1.64 |
| @70% | 2.42 | 1.98-2.42 |

One of the benefits of fabric 200 is that it offers a great degree of comfort because it has a lower modulus and stretches easily with the wearer. Fabric B is appropriate for shaping swimwear, underwear, and lighter control fabric in comparison to Fabric A. During water fitness activities, for example, the fabric stretch is often greater than 70%; however, due to the flatter stress-strain curve, shaping and comfort exist over a wider stretch range to preserve comfort for the wearer.

Fabric 200 in accordance with the present disclosure stretches in the range of 193% to 237% of its original width direction 205, length direction 210 and in a 45° diagonal direction 215 relative to width direction 205 and length direction 210. (As measured by the Zwick machine in accordance with the above noted procedure and using the first flex reading.) At 30% elongation, width direction 205, length direction 210 and 45° diagonal direction 215, each has a modulus within a range from 0.69 to 0.85 lbs of holding power. At 50% elongation, width direction 205, length direction 210 and in a 45° diagonal direction 215 of fabric 200, each has a modulus within a range from 1.33 to 1.64 lbs of holding power. At 70% elongation, width direction 205, length direction 210 and 45° diagonal direction 215 of fabric 200, each has a modulus within a range from 1.98 to 2.42 lbs of holding power. Thus, at all levels of elongation, the modulus or pounds of holding power are within the Industry Standard Range.

The fabrics 100 and 200 of the present disclosure may be included in only certain portions of the garment, for example, swimming suit 10, such as in the front panels 35 and not in the rear panel 40, or in portions of both the front panel 35 and rear panel 40 in bra portion 20 and in particular the bra frame construction for added support and comfort. Fabric 100 and fabric 200 can also be used in the crotch 50 to prevent unwanted constriction movement during wear. Significantly, fabric 100 and fabric 200 are exemplary isotropic fabrics.

Figure 5A:
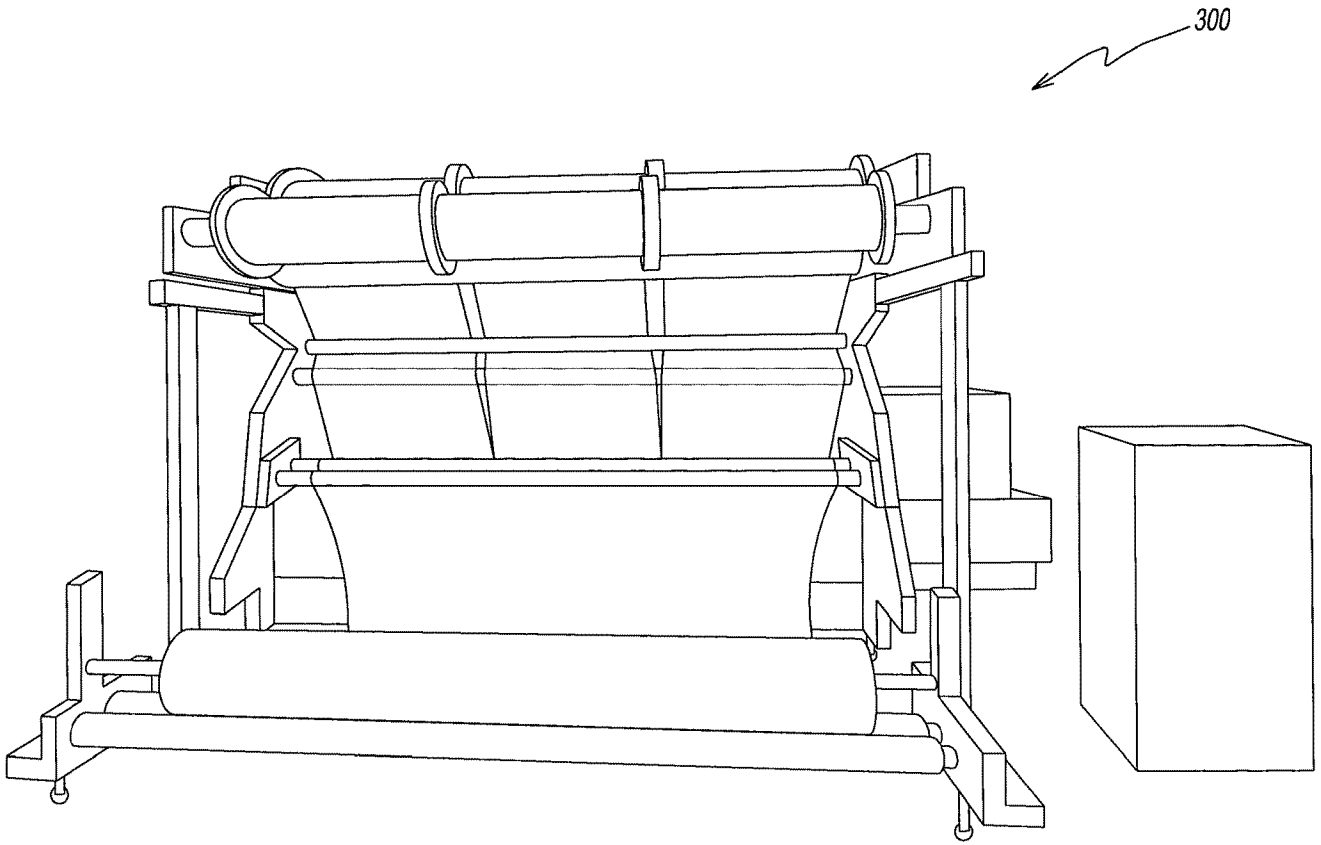
FIGS. 5a and 5b show a photograph of an exemplary machine that is used to knit the isotropic fabric of FIG. 2.
Figure 5B:
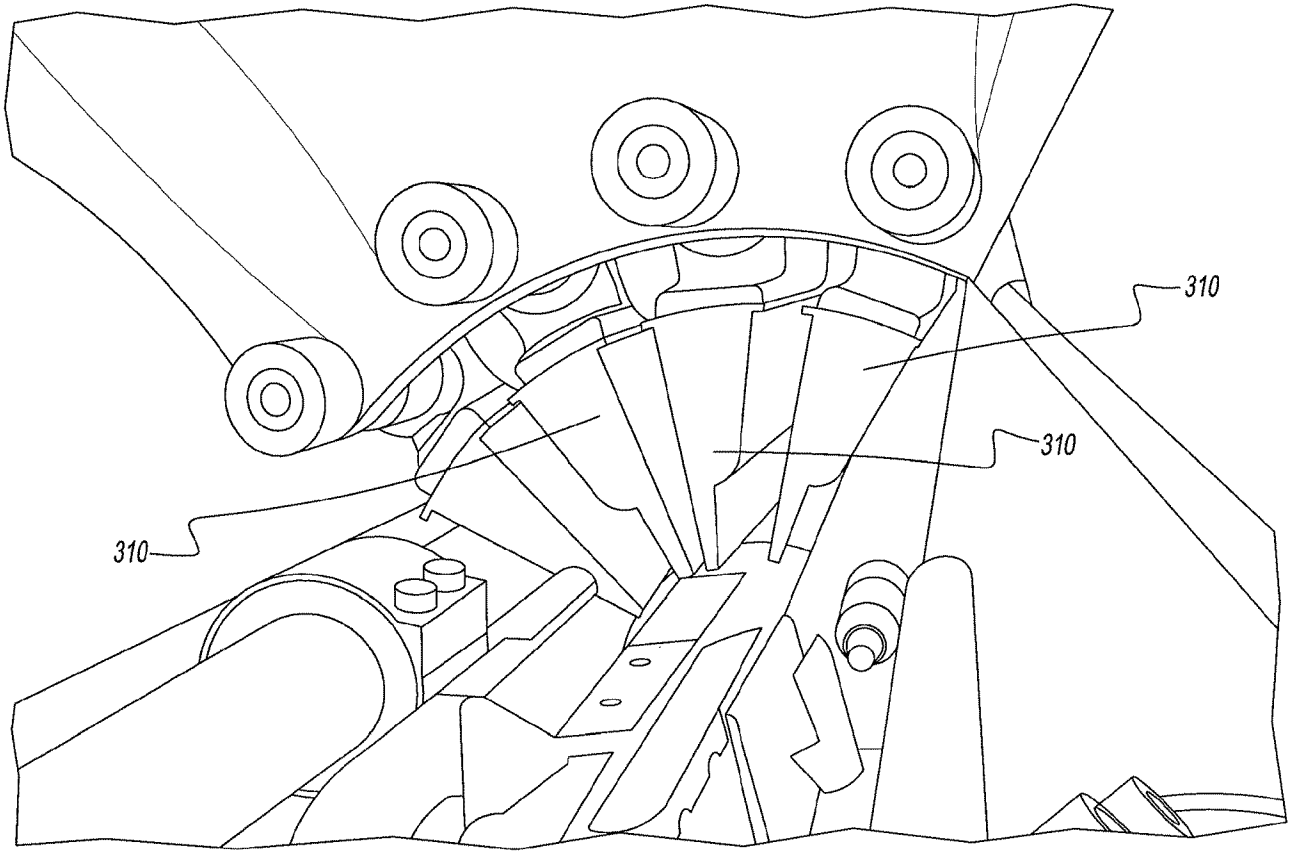

Referring to FIGS. 5a and 5B, fabric 100 and is knitted using a warp knitting machine, such as machine 300 having at least three guide bars 310, as shown in FIG. 5b. FIG. 5a shows a knitting machine with four guide bars; however, three such bars can be used to knit fabric 100. Fabric 100 is knitted using three bars of yarn that are intertwined together. Bars of yarn can be range from two to three yarns, depending upon the qualities of the yarn, so long as the elongations in the length direction, width direction and 45° diagonal direction, fall within the stated ranges in Table 1. Accordingly, each warp set of yarn of three yarns is threaded through one of the three guide bars 310 of the knitting bar to create the knitted construction of fabric 100. Fabric 100 is a Raschel construction with one bar of nylon and two bars of spandex. By using two different spandex yarns in the fabric, with different stitches on the two bars, the isotropic stretch and modulus are achieved.

The present disclosure has been described with particular reference to the preferred embodiments. It should be understood that the foregoing descriptions and examples are only illustrative of the present disclosure. Various alternatives and modifications thereof can be devised by those skilled in the art without departing from the spirit and scope of the present disclosure. Accordingly, the present disclosure is intended to embrace all such alternatives, modifications, and variations that fall within the scope of the appended claims.

We claim:

1. A single layer fabric that forms a garment, the fabric comprising:

a layer of material that lies in a single plane to form the garment, wherein the material comprises a first direction having a first modulus of elasticity, a second direction that is perpendicular to the first direction, wherein the second direction has a second modulus of elasticity and a third direction that is at an angle of 45 degrees to the first direction and the second direction, wherein the third direction has a third modulus of elasticity, and wherein the first modulus of elasticity, the second modulus of elasticity and the third modulus of elasticity are within the same ranges of magnitude of modulus of elasticity and form the single layer fabric with equal modulus of elasticity in said first direction, said second direction and said third direction, and wherein the single layer fabric further comprises at least three knitted yarns, wherein one of said three knitted yarns is knitted in said first direction, a second of said knitted yarns is knitted in said second direction, and a third of said three knitted yarns is knitted in said third direction,

*wherein said at least three knitted yarns comprise two elastomeric yarns and one non-elastomeric yarn.*

[2. The single layer fabric according to claim 1, wherein each of said at least three knitted yarns is either an elastomeric yarn or a non-elastomeric yarn.]

[3. The single layer fabric according to claim 1, wherein said at least three knitted yarns comprise two elastomeric yarns and one non-elastomeric yarn.]

[4. The single layer fabric according to claim 1, wherein said at least three knitted yarns comprise one elastomeric yarn and two non-elastomeric yarns.]

5. The single layer fabric according to claim [2] *1*, wherein the elastomeric yarns comprise spandex.

6. The single layer fabric according to claim [2] *1*, wherein the non-elastomeric yarn comprises nylon, polyester, cotton, rayon or polypropylene or any combinations thereof.

7. The single layer fabric according to claim [3] *1*, wherein said at least three integrally knitted yarns comprise 8% to 60% elastomeric yarn by weight and 40% to 92% non-elastomeric yarn by weight.

[8. The single layer fabric according to claim 4, wherein said at least three integrally knitted yarns comprise 50% to 85% non-elastomeric yarns by weight and 15% to 50% elastomeric yarns by weight.]

9. The single layer fabric according to claim 1, wherein said layer of material comprises three bars of yarn and two of said three bars of yarn comprise elastomeric yarns that are integrally connected by a heating process.

10. The single layer fabric according to claim 9, wherein one of the three bars lies in said first direction, a second of the three bars lies in said second direction and a third of the three bars lies in said third direction.

11. The single layer fabric according to claim 1, wherein the ranges of magnitude of modulus are from 2.77 to 3.38 pounds of holding power at 30% stretch in the first direction, the second direction and the third direction, 5.85 to 7.15 pounds of holding power at 50% stretch in the first direction, the second direction and the third direction and 9.31 to 11.37 pounds of holding power at 70% stretch in the first direction, the second direction and the third direction.

12. The single layer fabric according to claim 1, wherein the stretch of the fabric in the first direction, the second direction and the third direction is in the range of from 112% to 137%.

13. The single layer fabric according to claim 1, wherein the ranges of magnitude of modulus are from 0.69 to 0.85 pounds of holding power at 30% stretch in the first direction, the second direction and the third direction, 1.33 to 1.64 pounds of holding power at 50% stretch in the first direction, the second direction and the third direction and 1.98 to 2.42 pounds of holding power at 70% stretch in the first direction, the second direction and the third direction.

14. The single layer fabric according to claim 1, wherein the stretch of the fabric in the first direction, the second direction and the third direction is in the range of from 193% to 237%.

15. The single layer fabric according to claim 1, wherein said first direction is a length direction, said second direction is a width direction being perpendicular to said length direction and said third direction is a diagonal direction at 45 degree angle to both said first direction and said second direction.

16. A garment comprising:

a single layer *circular knit* fabric covering a portion of a body of a wearer, wherein the single layer fabric comprises an isotropic material having a first direction having a first modulus of elasticity, a second direction that is perpendicular to the first direction, wherein the second direction has a second modulus of elasticity and a third direction that is at an angle of 45 degrees to the first direction and the second direction, wherein the third direction has a third modulus of elasticity, wherein the first modulus of elasticity, the second modulus of elasticity and the third modulus of elasticity are within the same ranges of magnitudes of modulus of elasticity, and *wherein the first modulus of elasticity, the second modulus of elasticity and the third modulus of elasticity each have from 0.69 to 0.85 pounds of holding power at 30% stretch in the first direction, the second direction and the third direction, 1.33 to 1.64 pounds of holding power at 50% stretch in the first direction, the second direction and the third direction, and 1.98 to 2.42 pounds of holding power at 70% stretch in the first direction, the second direction and the third direction, and* wherein the single layer fabric further comprises [three] *two* yarns that are either an elastomeric yarn or a non-elastomeric yarn.

[17. The garment according to claim 16, wherein said three yarns are knitted on a circular knitting machine.]

[18. The garment according to claim 16, wherein said three yarns are knitted in three bars.]

[19. The garment according to claim 16, wherein two of said three yarns are elastomeric yarns and one of said yarns is a non-elastomeric yarn.]

20. The garment according to claim 16, wherein [said integrally knitted] *the two* yarns *are integrally knitted yarns that* comprise [two] *at least one* non-elastomeric [yarns] *yarn* and *at least* one elastomeric yarn.

21. The garment of claim 16, wherein [said] *the* elastomeric [yarns comprise] *yarn comprises* spandex.

22. The garment according to claim 16, wherein the non-elastomeric yarn [comprises] *is selected from the group consisting of* nylon, polyester, cotton, rayon or polypropylene [or], *and* any combinations thereof.

[23. The garment according to claim 19, wherein said knitted yarns comprise 8% to 60% elastomeric yarns by weight and 40% to 92% non-elastomeric yarns by weight.]

24. The garment according to claim 20, wherein the [integrally knitted] *two* yarns *are integrally knitted yarns that* comprise 50% to 85% non-elastomeric yarn by weight and 15% to 50% elastomeric yarn by weight.

[25. The garment according to claim 19, wherein said two elastomeric yarns are integrally connected by a heating process.]

[26. The garment according to claim 18, wherein one of the three bars lies in a length direction, a second of the three bars lies in a width direction perpendicular to the first bar and a third of the three bars lies in a direction at a 45° angle to the first bar and the second bar.]

[27. The garment according to claim 16, wherein the ranges of magnitude of modulus are from 2.77 to 3.38 pounds of holding power at 30% stretch in the first direction, the second direction and the third direction, 5.85 to 7.15 pounds of holding power at 50% stretch in the first direction, the second direction and the third direction and 9.31 to 11.37 pounds of holding power at 70% stretch in the first direction, the second direction and the third direction.]

[28. The garment according to claim 16, wherein the stretch of the single layer fabric in the first direction, the second direction and the third direction is in the range of from 112% to 137%.]

[29. The garment according to claim 16, wherein the ranges of magnitude of modulus are from 0.69 to 0.85 pounds of holding power at 30% stretch in the first direction, the second direction and the third direction, 1.33 to 1.64 pounds of holding power at 50% stretch in the first direction, the second direction and the third direction and 1.98 to 2.42 pounds of holding power at 70% stretch in the first direction, the second direction and the third direction.]

30. The garment according to claim 16, wherein the stretch of the single layer fabric in the first direction, the second direction and the third direction is in the range of from 193% to 237%.

31. The garment according to claim 16, wherein the single layer fabric comprises at least one of a torso portion to be worn on the torso of the body; a bra portion to be worn over the bust area of the body; or a panty portion including a crotch portion to be worn over the buttocks of the body or any combinations thereof.

32. The garment according to claim 31, wherein the torso *portion* further comprises a front panel and a back panel.

33. The garment according to claim 31, wherein the bra portion is connected to the torso portion and the torso portion is connected to the panty portion.

34. The garment according to claim [19] *20*, wherein the *at least one* non-elastomeric yarn comprises a flat filament nylon yarn.

35. The garment according to claim 20, wherein the *at least one* non-elastomeric [yarns comprise] *yarn comprises* a textured filament nylon.

*36. A garment comprising:*

*a single layer circular knit fabric covering a portion of a body of a wearer, wherein the single layer fabric*

*comprises an isotropic material having a first direction having a first modulus of elasticity and a second direction that is perpendicular to the first direction, wherein the second direction has a second modulus of elasticity, and a third direction that is at an angle of 45 degrees to the first direction and the second direction, wherein the third direction has a third modulus of elasticity,*

*wherein the first modulus of elasticity, the second modulus of elasticity and the third modulus of elasticity are within the same ranges of magnitudes of modulus of elasticity, and*

*wherein the single layer fabric comprises two yarns that comprise at least one elastomeric yarn and at least one non-elastomeric yarn, and*

*wherein the stretch of the single layer fabric in the first direction, the second direction and the third direction is in the range of from 193% to 237%.*

* * * * *